US011453396B2

(12) United States Patent
Nakane et al.

(10) Patent No.: US 11,453,396 B2
(45) Date of Patent: Sep. 27, 2022

(54) VEHICLE CONTROL METHOD AND CONTROL DEVICE

(71) Applicant: Nissan Motor Co., Ltd., Yokohama (JP)

(72) Inventors: Yusuke Nakane, Kanagawa (JP); Takeshi Hirata, Kanagawa (JP); Takanobu Sawada, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 271 days.

(21) Appl. No.: 16/647,054

(22) PCT Filed: Oct. 10, 2017

(86) PCT No.: PCT/JP2017/036700
§ 371 (c)(1),
(2) Date: Mar. 13, 2020

(87) PCT Pub. No.: WO2019/073528
PCT Pub. Date: Apr. 18, 2019

(65) Prior Publication Data
US 2020/0262432 A1    Aug. 20, 2020

(51) Int. Cl.
*B60W 30/18* (2012.01)
*B60W 10/06* (2006.01)
(Continued)

(52) U.S. Cl.
CPC ...... *B60W 30/18072* (2013.01); *B60W 10/06* (2013.01); *B60W 50/08* (2013.01);
(Continued)

(58) Field of Classification Search
CPC .. B60W 30/1807; B60W 10/06; B60W 50/08; B60W 2556/10; B60W 2554/4049;
(Continued)

(56) References Cited

U.S. PATENT DOCUMENTS 9,605,614 B2    3/2017 Miura et al.
2015/0315991 A1* 11/2015 Miura ............. B60W 30/18018
701/104

FOREIGN PATENT DOCUMENTS

DE    102017204224 A1 *  9/2018
JP    2012-121417 A    6/2012
(Continued)

OTHER PUBLICATIONS

Glora, DE102017204224_machine_translation (Mar. 2017) (Year: 2017).*

*Primary Examiner* — Anne Marie Antonucci
*Assistant Examiner* — Patrick M Brady
(74) *Attorney, Agent, or Firm* — Global IP Counselors, LLP

(57) ABSTRACT

A vehicle control method for controlling a vehicle in which a sailing control for traveling under inertia is executed when a vehicle is traveling. Each time the sailing control is executed, a history of sailing control is stored as history information classified according to situations in which sailing control was canceled. Also, a current travel situation is specified, history information corresponding to a current travel situation is specified from the stored history information, and whether to allow or disallow sailing control is determined based on the specified history information.

9 Claims, 2 Drawing Sheets

(51) Int. Cl.
*B60W 50/08* (2020.01)
*B60W 10/02* (2006.01)
(52) U.S. Cl.
CPC ..... *B60W 10/02* (2013.01); *B60W 2030/1809* (2013.01); *B60W 2554/4049* (2020.02); *B60W 2556/10* (2020.02)
(58) Field of Classification Search
CPC ......... B60W 10/02; B60W 2030/1809; B60W 30/18072
See application file for complete search history.

(56) References Cited

FOREIGN PATENT DOCUMENTS

| | | |
|---|---|---|
| JP | 2015-63220 A | 4/2015 |
| WO | 2014/091591 A1 | 6/2014 |

* cited by examiner

VEHICLE CONTROL METHOD AND CONTROL DEVICE

CROSS-REFERENCE TO RELATED APPLICATIONS

This application is a U.S. national stage application of International Application No. PCT/JP2017/036700, filed on Oct. 10, 2017.

BACKGROUND

Technical Field

The present invention relates to control of a vehicle in which a sailing control for traveling under inertia is executed when a vehicle is traveling.

Background Information

Over the past several years there have come to be known controls for stopping a drive source when a vehicle is traveling in order to further improve fuel efficiency performance of the vehicle. Examples of such control include idle stop control in which an engine serving as the drive source is stopped when a driver depresses a brake pedal and the vehicle is at low speed. However, an increase in fuel injection amount on startup occurs when the idle stop control is canceled, and the engine is restarted. Therefore, a risk is presented that if a time over which the drive source is stopped is shorter than a prescribed time (e.g., about 5 seconds) in idle stop control, an amount of fuel required to restart the engine will be greater than a fuel consumption amount reduced by stopping the engine, and the fuel efficiency will actually worsen.

Therefore, in a control described in Japanese Laid-open Patent Application No. 2015-063220A1, it is assessed as to whether or not to allow idle stop control, by using history information of idle stop control in a current travel section, in order to prevent worsening of fuel efficiency due to idle stop control. Specifically, a failure rate of idle stop control when idle stop control was executed in the past in the travel section is stored as history information, and idle stop control is disallowed when the failure rate is high. "Failure of idle stop control" refers to instances where a time over which an engine is stopped is shorter than a prescribed time over which a fuel-efficiency-improving effect can be obtained. "Failure rate" refers to a ratio of failures to a number of times idle stop control is carried out.

Incidentally, in addition to an idle stop control, a sailing control is also a control in which an engine is stopped during traveling. "Sailing control" refers to a control for stopping a drive source and traveling under inertia when a driver is not depressing an accelerator pedal, or a brake pedal and a vehicle speed is in a prescribed sailing vehicle speed region.

As is true in the sailing control as well as in idle stop control, a problem is presented that fuel efficiency actually worsens when a time over which the engine is stopped is short.

A factor contributing to idle stop control being canceled is when there is no need for a response to a vehicle-stopping factor such as a red traffic signal or a temporary stop, and there is no need for a brake operation. Since the cancelation factors are thus limited, reliability of the failure rate obtained by accumulating instances of failure of idle stop control as history information is ensured even when the failures are assessed according to the time over which the engine is stopped as in the abovementioned document.

However, factors in the sailing control being canceled are diverse, including those due to driver-performed operations such as operation of an accelerator pedal or a brake pedal, or those due to system requirements, such as acceleration or deceleration when having deviated from a sailing vehicle speed region. In addition, operation of the accelerator pedal or the brake pedal is not only performed in response to status of the roads such as slopes or curves, but is performed also in response to a status of vehicles around a host vehicle. For example, even when the status of the road is the same, different operations may be performed when there is no vehicle around the host vehicle or when there is another vehicle traveling in front of the host vehicle.

Accordingly, when the failure of the sailing control is assessed only based on the time over which the engine is stopped as in the abovementioned document, failures due to various cancelation factors will get included in the history information. For example, failures that are not related to status of the roads in a travel section but result from behavior of a vehicle around the host vehicle also can be included. Therefore, history information accuracy declines when failure is assessed only based on the time over which the engine is stopped. Also, a risk is presented that decline in fuel efficiency due to carrying out of the sailing control cannot be suppressed when whether to allow or disallow the sailing control is decided based on such history information.

Therefore, an object of the present invention is to increase the accuracy of history information concerning success or failure of the sailing control and to suppress decline in fuel efficiency due to carrying out of the sailing control.

According to one embodiment of the present invention, there is provided a method for controlling a vehicle in which the sailing control for traveling under inertia is executed when a vehicle is traveling. In this control method, each time the sailing control is executed, a history of the sailing control is stored as history information classified according to situations in which the sailing control was canceled; a current travel situation is specified; and history information that corresponds to the current travel situation is specified from the stored history information. Also, whether to allow or disallow the sailing control is determined based on the specified history information.

PREFERRED EMBODIMENTS OF THE INVENTION

Embodiments of the present invention are described below with reference to the accompanying drawings.

Figure 1:
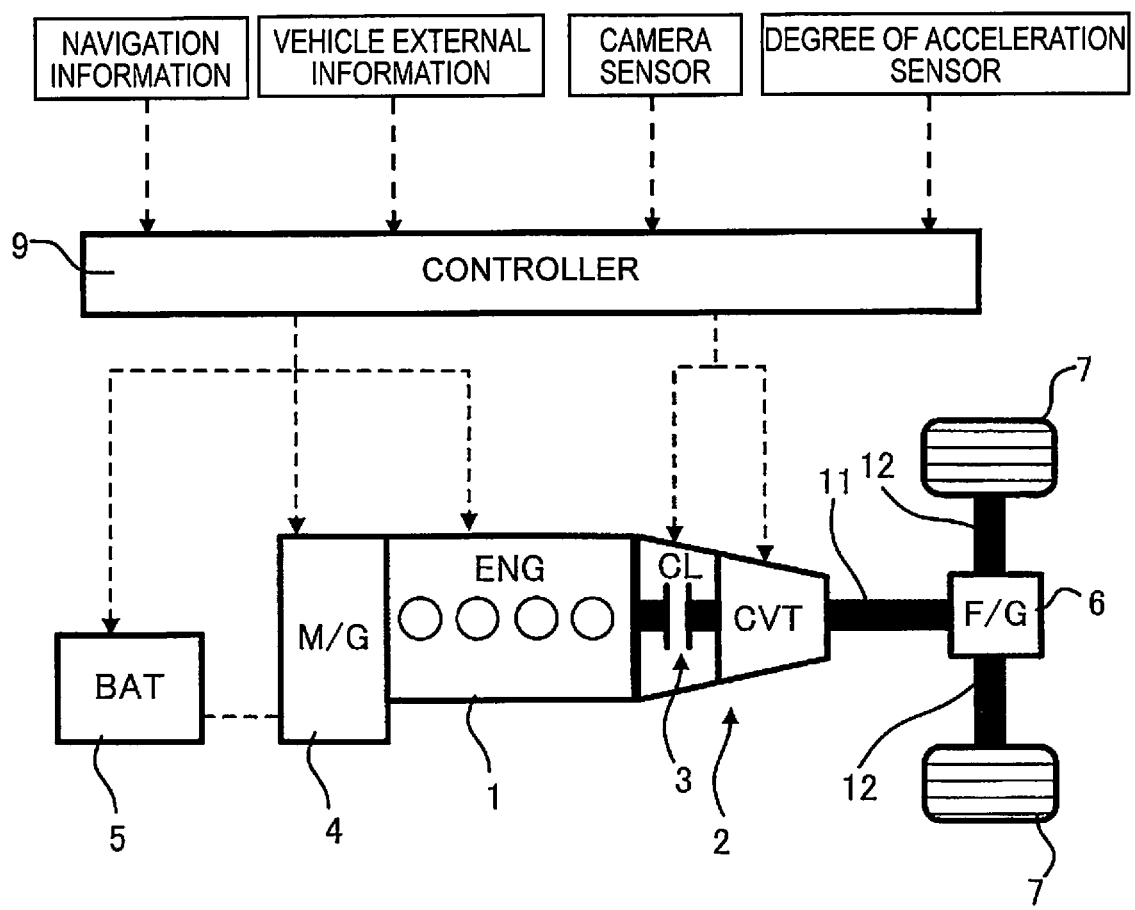
FIG. 1 is a structural diagram of a system of a vehicle.

FIG. 1 is a structural diagram of a system of a vehicle according to the present embodiment. The vehicle comprises an engine 1 that serves as a drive source, an automatic transmission 2, a motor generator ("MG") 4, a battery 5, a final gear device 6, a pair of drive wheels 7, and a controller 9.

The engine 1 is an internal combustion engine in which gasoline or light oil is used as a fuel. Engine speed, torque, etc., are controlled based on commands from the controller 9.

The automatic transmission 2 is a continuously variable transmission in the present embodiment, and comprises a clutch 3 serving as a forward engaging element. The clutch 3 is arranged between a transmission mechanism of the continuously variable transmission and the engine 1. When the clutch 3 is to engage, rotation torque of the engine 1 is transmitted to the drive wheels 7 via the automatic transmission 2, a propeller shaft 11, the final gear device 6, and drive shafts 12. Shift control, and disengagement control of the forward engaging element are performed by the controller.

The MG 4 is a synchronous dynamo-electric machine that is connected to an output shaft of the engine 1 via a transmission mechanism (not shown) comprising belts and pulleys. The MG 4 functions as a power generator upon receiving rotational energy from the engine 1, and the generated power charges the battery 5. In addition, the MG 4 can function as a power generator when the engine 1 co-rotates with the drive wheels 7. In other words, kinetic energy of the vehicle can be regenerated as electrical power by the MG 4. It is also possible to drive the MG 4 using electrical power from the battery 5, and perform torque assist for the engine 1 using the torque of the MG 4.

The controller 9 receives, as inputs, information from an onboard navigation system (navigation information), outside information acquired through vehicle-to-vehicle communication or road-to-vehicle communication, information from an onboard camera, and detection signals from acceleration sensors. The controller 9 also receives, as inputs, signals from a crank angle sensor that detects engine speed, an accelerator position sensor, a brake sensor that that detects the extent to which the brake is depressed, etc. The controller 9 executes torque control of the engine 1, a vehicle behavior control, a sailing control (described hereunder), etc., based on the signals. The navigation system, communication device acquiring outside information, onboard camera, and sensors correspond to a travel situation acquisition unit.

The controller 9 is configured from a microcomputer comprising a central processing unit (CPU), read-only memory (ROM), random access memory (RAM), and an input/output interface (I/O interface). The controller 9 can also be configured from a plurality of microcomputers.

The sailing control executed by the controller 9 shall now be described.

"Sailing control" refers to control in which a vehicle travels under inertia by placing the forward clutch 3 into a disengaged state when a prescribed sailing condition is fulfilled during traveling and sailing is allowed by an allowing assessment (described hereunder). The state of traveling by executing the sailing control is referred to hereunder as "sailing travel."

Sailing conditions include, for example, a vehicle speed being equal to or greater than a preset lower-limit vehicle speed, an accelerator pedal or a brake pedal being depressed, and a forward range being selected in the automatic transmission 2. The lower-limit vehicle speed is medium or high speed when a vehicle speed range is divided into low, medium, and high speed, and the lower-limit vehicle speed is set in advance by experimentation, etc.

The sailing control ends if a sailing cancelation condition is fulfilled during sailing travel. Sailing cancelation conditions include a vehicle speed being lower than the lower-limit vehicle speed, the accelerator pedal having been depressed, or the brake pedal having been depressed. In addition, if autonomous driving mode has been allowed, the sailing cancelation conditions also include, inter alia, a case in which the vehicle speed is reduced as a distance from a leading vehicle decreases, or a case in which the vehicle speed is increased as a distance from a leading vehicle is increased.

The sailing control in the present embodiment includes a sailing stop control for automatically stopping the engine 1 during sailing travel, and a sailing idle control for running the engine 1 at idling speed during sailing travel. In the sailing stop control, the sailing cancelation conditions also include a case in which there is a need to drive the MG 4 as an amount of battery charge decreases, or a case in which there is a need to drive a compressor for an air conditioner.

A description shall now be provided for an assessment for allowing the sailing control.

When a sailing cancelation condition is fulfilled, the engine 1 is restarted in the case of sailing stop control, and synchronous control for increasing a rotation speed on an input side of the clutch 3 to a rotation speed on an output side is performed in the case of sailing idle control. A so-called "startup increase" occurs when the engine 1 is restarted. In addition, in synchronous control, fuel is consumed in order to increase the rotation speed of the engine 1. Therefore, a risk is presented that if a time over which the engine 1 is stopped by the sailing control is shorter than a prescribed time (for example, about 5 seconds), an amount of fuel consumed when the sailing control is canceled will be greater than a fuel consumption amount reduced by the sailing control; i.e., the sailing control will end as a failure.

Therefore, when the sailing control is canceled and the time over which the engine is stopped due to the sailing control is shorter than the prescribed time, it is preferable that the road on which the sailing control was performed should be stored as a road on which the sailing control ends up being canceled immediately, and when the host vehicle next travels on this road on which the sailing control ends up being canceled immediately, the sailing control should be disallowed rather than being allowed, even if a sailing condition was fulfilled, so that the sailing control is not executed.

Therefore, in the assessment for allowing the sailing control, when it is predicted, based on history information (described hereunder), that executing the sailing control will lower fuel consumption, the controller 9 will disallow execution of the sailing control.

"History information" is a stored history of the sailing control for when the sailing control was executed in the past at a given location currently being traveled, the history being classified according to situations in which the sailing control was canceled. Specifically, situations in which the sailing control was canceled are classified based on the sailing control cancelation factors and elements constituting the cancelation factors ("cancelation elements"), and a sailing control continuation time and a sailing control success rate (described hereunder) are stored for each classified category.

Cancelation factors are classified according to whether the cancelation was performed due to system requirement or whether the cancelation was performed due to intervention by a driver operation.

"Cancelation due to system requirement" is, for example, cancelation in response to an engine startup requirement for acceleration when a vehicle speed is lower than a lower-limit vehicle speed included in the sailing conditions, in response to an engine startup requirement for power generation when an amount of battery charge is low, or in response to other considerations. "Cancelation due to intervention by a driver operation" is, for example, cancelation in response to the driver depressing the accelerator pedal for acceleration or depressing the brake pedal for deceleration.

Cancelation elements are classified according to whether the cancelation elements are dynamic factors or static factors.

"Dynamic factors" refers to operating of the accelerator pedal or the brake pedal in relation to a vehicle traveling on the periphery of the host vehicle. Dynamic factors include, for example, depressing the accelerator pedal because a trailing vehicle has moved closer, depressing the accelerator pedal because a leading vehicle has accelerated and the leading vehicle is to be follows, or depressing the brake pedal because a distance from a leading vehicle has shortened.

"Static factors" refers to operating of the accelerator pedal or the brake pedal in relation to situations specific to the given location (for example, road shape or gradient, or speed limit, etc.). Static factors include, for example, depressing the accelerator pedal on an upwardly sloping road, or depressing the accelerator pedal in order to accelerate in response to a raised legal speed limit. Also included is depressing the brake pedal in order to decelerate ahead of a downwardly sloping road or curve, depressing the brake pedal on having approached a temporary stop line or a toll plaza, or depressing the brake pedal in order to decelerate in response to a lower legal speed limit. Further included is depressing the brake pedal when another vehicle has moved closer at a merge point on a highway or when entering a downward slope.

"Sailing control success rate" is a ratio of a number of times in which the sailing control has succeeded to a number of times in which the sailing control was carried out. "Sailing control success" means that by executing the sailing control, fuel consumption can be reduced to a greater extent than when the sailing control is not executed. Specifically, the sailing control is successful if a time over which the engine is stopped by the sailing control is equal to or greater than a prescribed time (e.g., about 5 seconds). A sailing control failure rate may be stored instead of the sailing control success rate.

Specifically, history information is stored classified based on whether the sailing control cancelation factors are due to system requirements or due to intervention by a driver operation, and furthermore classified based on whether the cancelation elements are dynamic factors or static factors. A sailing control continuation time and a success rate are stored for each classified category. In addition, specific details of the cancelation elements are stored in combination for each category.

Specific details of cancelation elements include information indicating status of surroundings, such as distance from a leading vehicle detected by radar, distance from a leading vehicle detected by the onboard camera, road signs acquired by image recognition using the camera, traffic signal states and illuminating of brake lights of a leading vehicle, and change of traffic signal states as acquired by road-to-vehicle communication. Event notification and route information from the navigation system also are included. "Event notification" is notification, for example, that there is a temporary stop line or a toll plaza, etc., in the forward direction. Specific details of cancelation elements include also information concerning driver operations, such as the operation of the accelerator pedal and the brake pedal, steering operations, and turn signal operations. The information concerning status of surroundings or driver operations is used when specifying history information to be referred to in the control to be described hereunder.

History information may be more finely classified based on specific details of cancelation elements. For example, three levels; i.e., less than 10 m, 10 m to less than 30 m, and 30 m or longer, may be provided for the inter-vehicle distance relative to the leading vehicle, and each category classified according to cancelation factor and cancelation element may be further classified according to the level of inter-vehicle distance. In addition, levels corresponding to speed limit acquired by the onboard camera may be provided, and the categories may be classified according to the levels. As shall be apparent, history information classified in accordance with speed limit may be further classified according to distance between vehicles.

The controller 9 determines whether or not to execute the sailing control based on history information of a given location currently being traveled. This assessment, in principle, is performed based on the sailing control success rate in cases that result from intervention by a driver operation and in which the cancelation factors are static factors. This is because continuation times in cases in which the sailing control was canceled by dynamic factors that are not related to characteristics of the given location such as gradient or road shape but are solely dependent on relationships with other vehicles become noise in the assessment of whether or not to allow the sailing control, and therefore this noise is to be excluded. However, for example, when there is a possibility in a current status of surroundings that sailing control might be canceled by a dynamic factor, such as when an inter-vehicle distance relative to a leading vehicle is short, it is determined whether or not to execute the sailing control based on the history information in the case when the sailing control was canceled by the dynamic factor. In this case, a highly accurate determination becomes possible if the history information is finely classified based on specific details of the cancelation elements.

Even on the same travel route, traffic volume often differs greatly depending on the time band, the day of the week, or the season. Therefore, the abovementioned categories may be further classified according to the time band, the day of the week, or the season when traveling.

In addition, the controller 9 also updates the history information as described hereunder, in order to increase the accuracy of the allowing assessment.

The control executed by the controller 9 shall now be described in further detail.

Figure 2:
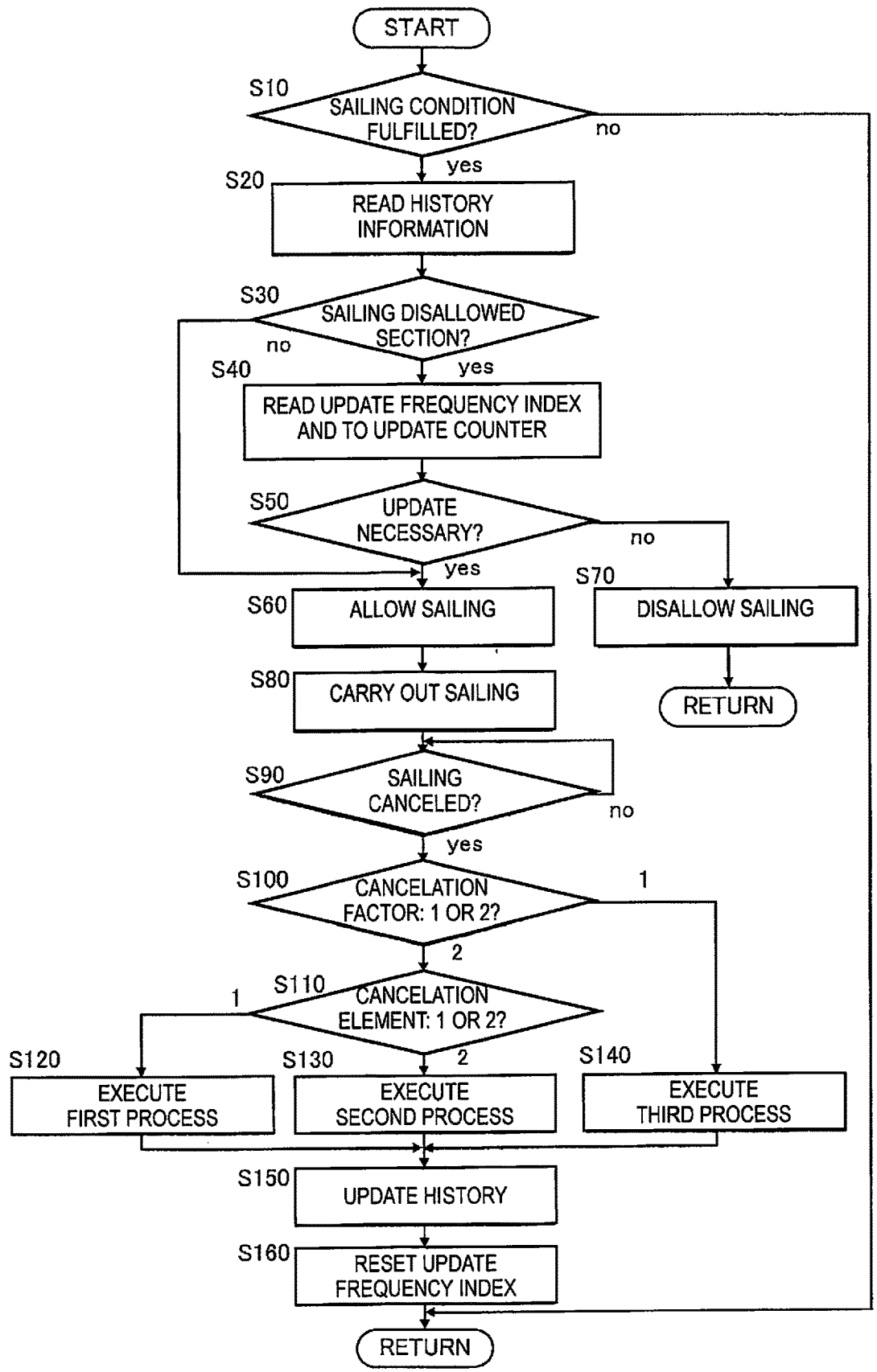
FIG. 2 is a flow chart of a control routine executed by a controller.

FIG. 2 is a flow chart of a control routine executed by the controller 9.

In step S10, the controller 9 assesses whether or not the abovementioned sailing condition is fulfilled. If a sailing condition is fulfilled, the controller executes a process of step S20, and if a sailing condition is not fulfilled, the present routine is ended.

In step S20, the controller 9 specifies history information corresponding to information concerning the current status of surroundings and driver operations, as part of the history information of the current host vehicle position, and refers to this history. For example, in circumstances where there is no leading vehicle, then, in accordance with the abovementioned principle, the controller refers to history information of cases that result from driver operations and in which the cancelation factors are static factors. Meanwhile, when it is highly possible that the sailing control might be canceled by a dynamic factor, for example, because an inter-vehicle distance relative to a leading vehicle is shorter than a prescribed value, the controller refers to history information of cases that result from driver operations and in which the cancelation factors are dynamic factors.

In step S30, the controller 9 assesses, based on the history information, whether or not the current host vehicle position is included in a sailing disallowed section. A "sailing disallowed section" is a section in which a sailing control success rate is lower than a threshold value. The threshold value can be set optionally, and is set, for example, as 50%-60%. Whether or not a sailing disallowed section applies may be assessed based on the success rate each time step S30 is executed, but in the present embodiment, whether or not the given location is included in a sailing disallowed section is stored, and the assessment of step S30 is performed by referring to this fact.

The controller 9 executes a process of step S40 when the current host vehicle position is included in the sailing disallowed section, and executes a process of step S60 when such is not the case.

There is no history information for a travel route that is traveled a first time. In this case, the controller 9 in step S20 extracts, from the history information, history information of a time when a travel route having a road shape such as road gradient or curvature of a curve close to that of the current travel route was traveled, and determines whether or not a sailing disallowed section applies based on the extracted history information.

When there is no history information of a resembling travel route, the controller 9 sets the assessment result of step S30 as "no."

In step S40, the controller 9 refers to an update frequency index and an update counter. An "update frequency index" is an index for which there has been established a frequency for updating the history information of a given location included in a sailing disallowed section. For example, when updating is to be performed each time a current host vehicle position is traveled n times, the update frequency index is "n." An update counter is a counter that indicates the number of times traveled since a previous update.

In step S50, the controller 9 assesses whether or not it is necessary to update the history information based on the update frequency index and the update counter. For example, when the update frequency index is 10, it is assessed that updating is necessary if the update counter is 10, and it is assessed that updating is not necessary if the update counter is 9 or lower. When updating is necessary, the controller 9 executes the process of step S60, and when updating is not necessary, the controller in step S70 disallows the sailing control, and the present routine is ended.

In step S60, the controller 9 allows execution of the sailing control.

As described above, even in a sailing disallowed section, the controller 9 executes the sailing control at the prescribed frequency based on the update frequency index and updates the history information. This is done because a risk is presented that when assessing whether to allow or disallow the sailing control, if the number of times in which the sailing control was executed in the past is small, the accuracy of assessment will decrease due to variation in results of execution of the sailing control. Another reason is that if subsequent updating of the history information is disallowed after sailing travel was once disallowed, the sailing control will end up being disallowed even when there is a possibility that the sailing control success rate might increase, for example, by changing of the status of the road.

Therefore, in the present control routine, an update frequency index is provided and the history information is updated by allowing the sailing control at a frequency corresponding thereto. This makes it possible to improve the accuracy of a determination of whether to allow or disallow the sailing control, and to flexibly respond to changes of status of the roads, etc.

The description of the flow chart shall now be resumed.

The controller 9 initiates the sailing control in step S80 and assesses whether or not the sailing control was canceled in step S90. The controller 9 iterates the assessment of step S90 until the sailing control is canceled, and if the sailing control has been canceled, the controller executes the control of step S100.

In step S100, the controller 9 assesses whether a sailing control cancelation factor is due to a system requirement (factor 1) or due to intervention by a driver operation (factor 2). It is assessed to be factor 1 if, for example, the vehicle speed is lower than a lower limit speed included in the sailing conditions and the engine has been started for acceleration. It is assessed to be factor 2, for example, if the engine has been started because the driver has depressed the accelerator pedal or the brake pedal.

The controller 9 executes a process of step S140 when the cancelation factor is factor 1, and executes a process of step S110 when the cancelation factor is factor 2.

In step S110, the controller 9 assesses whether the sailing control was canceled by a dynamic factor (element 1) or a static factor (element 2). The cancelation is assessed to be due to element 1, for example, if the brake pedal was depressed because a leading vehicle has moved closer. The cancelation is assessed to be due to element 2, for example, if the brake pedal was depressed because a temporary stop line was approached. The controller 9 executes a process of step S120 when the element is a dynamic factor, and executes a process of step S130 when the element is a static factor.

The controller 9 executes a first process in step S120 when the sailing control cancelation factor is due to intervention by a driver operation and the cancelation element is a dynamic factor. The first process includes updating the number of times in which sailing was canceled due to dynamic factors, recording a time over which the current round of the sailing control is maintained, and calculating a success rate based on the updated number of times in which sailing was canceled and the time maintained. Furthermore, the first process includes also recording information concerning the status of surroundings or driver operation as elements that indicate the situation when the sailing control was canceled.

The controller 9 executes a second process in step S130 when the sailing control cancelation factor is due to intervention by a driver operation and the cancelation element is a static factor. The second process includes updating the number of times in which sailing was canceled due to static factors, recording a time over which the current round of the sailing control is maintained, and calculating a success rate that is based on the updated number of times in which sailing was canceled and the time maintained. Furthermore, the second process includes recording information concerning the status of surroundings or driver operation as elements that indicate the situation when the sailing control was canceled.

The controller 9 executes a third process in step S140 when the sailing control cancelation factor is a system requirement. The third process includes updating the number of times in which sailing was canceled due to system requirements, recording a time over which the current round of the sailing control is maintained, and calculating a success rate based on the updated number of times in which sailing was canceled and the time maintained. Furthermore, the third process includes also recording information concerning the status of surroundings or driver operation as elements that indicate the situation when the sailing control was canceled.

As described above, when calculating a success rate included in history information, the calculation is performed for each category classified based on the sailing control cancelation factors and cancelation elements. This excludes cancelation due to insignificant cancelation factors or cancelation elements in each category. "Insignificant cancelation factors or cancelation elements" are cancelation factors or cancelation elements that have no relationship with information concerning the host vehicle position (for example, a road gradient or curvature of a curve) and arise only in a relationship between the host vehicle and a surrounding vehicle, for example, when the second process is executed. For example, when a leading vehicle applies the brakes, the host vehicle also applies the brakes and the sailing control is canceled. Such cancelation of the sailing control for reasons unrelated to a road gradient or curvature of a curve will be noise when calculating the success rate in a particular location, and therefore is excluded when calculating the success rate.

In step S150, the controller 9 updates the sailing disallowed section for the currently traveled location based on the result of the processes of any of steps S120-S140.

When classification is performed to even finer categories based on status of surroundings or driver operations after having performed the classification based on steps S100 and S110, first to third process is performed for each category in steps 5120-S140.

For example, having accelerated because a vehicle has moved closer from the rear and having decelerated because a distance from a leading vehicle has shortened both are included in dynamic factors, but can be classified into a category of cancelation due to acceleration and cancelation due to deceleration. In this case, the first process is executed for the category of cancelation due to acceleration if acceleration was performed because a vehicle has moved closer from the rear, and the first process is executed for the category of cancelation due to deceleration if deceleration was performed because a distance from a leading vehicle has shortened.

In addition, for static factors as well, for example, cancelation due to operations for acceleration and deceleration corresponding to gradients or road shapes, and cancelation due to operations for acceleration and deceleration corresponding to a change in the speed limit or approaching a temporary stop line can be classified into separate categories. In this case, for example, the second process is executed for the former category if the brake pedal was depressed in order to suppress acceleration on a decline, and the second process is executed for the latter category if the brake pedal was depressed because a temporary stop line was approached.

In step S160, the controller 9 resets the update frequency index based on the updated history information. For example, if variation in the sailing control continuation time decreases accompanying an increase in number of times in which the sailing control was executed, the update frequency index is changed from n up to n+10 in accordance with the extent of the decrease. This is because the reliability of the history information becomes higher as the variation becomes smaller, and the need to update decreases. The variation is quantified and evaluated using, e.g., standard deviation.

In the present embodiment as above, each time the sailing control is executed, a history of the sailing control is stored as history information classified according to situations in which the sailing control was canceled, a current travel situation is specified, and history information that corresponds to the current travel situation is specified from the stored history information. Also, whether to allow or disallow the sailing control is determined based on the specified history information. This makes it possible to exclude failures due to disturbances that become noise when calculating a sailing control success rate and therefore the accuracy of the success rate as history information is improved. As a result, the fuel efficiency actually declining by executing the sailing control can be suppressed.

Situations in which the sailing control is canceled are classified into cancelation due to system requirements and cancelation due to intervention by a driver operation. In addition, situations in which cancelation due to intervention by a driver operation are further classified into cancelation due to a dynamic factor that arise in relation to surrounding vehicles and situations due to static factors that arise in relation to situations specific to the given location. In addition, a sailing control continuation time and information concerning status of surroundings and driver operations are stored.

In the present embodiment, an update frequency index for which there has been established a frequency to update the history information is set, and the sailing control is allowed and the history information is updated at the frequency corresponding to the update frequency index even when it is determined that the sailing control is to be disallowed based on the history information. The history information is thereby updated at a prescribed frequency, and therefore the accuracy of the history information can be further increased.

In addition, even if a travel section was once recorded as a sailing disallowed section, it is also possible for the updating to be performed so that the travel section excluded from the sailing disallowed section, in response to subsequent changes in the status of the roads, etc. Therefore, occurrences of events in which the sailing control is disallowed despite the fact that a fuel-efficiency-improving effect can be obtained by executing the sailing control can be suppressed.

In the present embodiment, the update frequency index is reset based on the updated history information. As a consequence, the accuracy of the history is sufficiently high, and it is possible to suppress occurrences of events in which the sailing control is executed in order to update the history information and the fuel efficiency ends up declining, despite the fact that the sailing control clearly would fail.

In the present embodiment, when there is no information that corresponds to the current travel situation in the stored history information, history information in a travel situation resembling the current travel situation is extracted from the stored history information, and whether to allow or disallow the sailing control is determined based on the extracted history information. It is thereby possible to improve fuel consumption by appropriately determining whether to allow or disallow the sailing control, even on a first-time travel route.

In the present embodiment, in a method for controlling a vehicle in which the sailing control for traveling under inertia is executed when a vehicle is traveling, when the sailing control is canceled and when the time over which the engine is stopped due to the sailing control is shorter than a prescribed time, the road on which the sailing control was performed is stored as a road on which the sailing control ends up being canceled immediately. When this road on which the sailing control ends up being canceled immediately is traveled, the sailing control is not executed even if a sailing condition is fulfilled. This makes is possible to suppress the fuel efficiency actually declining by executing the sailing control.

Embodiments of the present invention have been described above, but the embodiments merely illustrate some examples of application of the present invention, the technical scope of the present invention not being limited to the specific configuration of the embodiments.

The invention claimed is:

1. A vehicle control method in which a sailing control for traveling under inertia is executed when a host vehicle is traveling, the vehicle control method comprising:
   storing a history of the sailing control as stored history information classified according to situations in which the sailing control was canceled each time the sailing control is executed; and
   when a prescribed sailing condition is fulfilled:
   specifying a current travel situation,
   specifying the stored history information that corresponds to the current travel situation from the stored history information,
   determining whether to allow or disallow the sailing control based on the stored history information that was specified,
   executing the sailing control upon determining the sailing control has been allowed,
   setting an update frequency index that establishes a frequency to update the stored history information, and
   allowing the sailing control and updating the stored history information at the frequency corresponding to the update frequency index even upon determining that the sailing control is to be disallowed based on the stored history information.

2. The vehicle control method according to claim 1, wherein
   the situations in which the sailing control is canceled are classified into cancelations due to system requirements and cancelations due to intervention by a driver operation.

3. The vehicle control method according to claim 2, wherein
   the situations classified as the cancelations due to the intervention by the driver operation are further classified into cancelations due to a dynamic factor arising in relation to surrounding vehicles, and cancelations due to a static factor arising in relation to situations specific to a given location.

4. The vehicle control method according to claim 1, wherein
   the storing of the stored history information includes a continuation time of the sailing control and information concerning status of surroundings and driver operations.

5. The vehicle control method according to claim 1, wherein
   the update frequency index is reset based on the stored history information that was updated.

6. The vehicle control method according to claim 1, wherein
   when there is no information that corresponds to the current travel situation in the stored history information:
   the stored history information in a travel situation resembling the current travel situation is extracted from the stored history information; and
   the determining of whether to allow or disallow the sailing control is based on the stored history information that was extracted.

7. The vehicle control method according to claim 1, further comprising:
   storing a road on which the sailing control was performed as a road on which the sailing control ends up being canceled immediately when the sailing control is canceled and a time over which an engine is stopped due to the sailing control is shorter than a prescribed time; and
   not executing the sailing control even if the sailing condition is fulfilled when the road on which the sailing control ends up being canceled immediately is traveled.

8. A vehicle control device in which a sailing control for traveling under inertia is executed when a host vehicle is traveling, the vehicle control device comprising:
   a travel situation acquisition system configured to acquire travel situations of the vehicle, the travel situation acquisition system comprising at least one of: a navigation system, a communication device, a camera and a sensor; and
   a controller configured to execute the sailing control,
   each time the controller executes the sailing control, the controller stores a history of the sailing control as stored history information that is classified according to situations in which the sailing control was canceled, and
   when a prescribed sailing condition has been fulfilled, the controller:
   specifies a current travel situation from the travel situations acquired by the travel situation acquisition system;
   specifies the stored history information that corresponds to the current travel situation from the stored history information;
   determines whether to allow or disallow the sailing control based on the stored history information that was specified;
   executes the sailing control when the sailing control has been allowed;
   sets an update frequency index that establishes a frequency to update the stored history information; and
   allows the sailing control and updates the stored history information at the frequency corresponding to the update frequency index even upon determining that the sailing control is to be disallowed based on the stored history information.

9. A vehicle control method in which a sailing control for traveling under inertia is executed when a host vehicle is traveling, the vehicle control method comprising:
   storing a history of the sailing control as stored history information each time the sailing control is executed, the stored history information including a current host vehicle position and information concerning a current status of surroundings or driver operations, and the stored history information being classified based on whether the sailing control was canceled due to the current status of surroundings or driver operations; and
   when a prescribed sailing condition is fulfilled:
   specifying a current travel situation,
   specifying the stored history information that corresponds to the current travel situation from the stored history information, determining whether to allow or disallow the sailing control based on the stored history information that was specified, and executing the sailing control upon determining the sailing control has been allowed.

\* \* \* \* \*